United States Patent
Ishibashi et al.

(10) Patent No.: US 7,312,892 B2
(45) Date of Patent: Dec. 25, 2007

(54) IMAGE PROCESSING APPARATUS, METHOD, AND PROGRAM PERFORMING CHROMATIC AND ACHROMATIC DATA CONVERSION FOR A PREFERRED WHITENESS IN AN IMAGE OUTPUT

(75) Inventors: Hideyasu Ishibashi, Kanagawa (JP); Hiroyuki Yoneyama, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 907 days.

(21) Appl. No.: 10/254,550

(22) Filed: Sep. 26, 2002

(65) Prior Publication Data

US 2003/0063303 A1 Apr. 3, 2003

(30) Foreign Application Priority Data

Sep. 27, 2001 (JP) ............................. 2001-297917

(51) Int. Cl.
*G06F 15/00* (2006.01)
*H04N 1/60* (2006.01)

(52) U.S. Cl. ........................ 358/1.9; 358/516; 358/518; 382/187

(58) Field of Classification Search ................. 358/1.9, 358/1.15, 516, 518, 3.02, 520, 461; 382/167, 382/162; 715/528; 347/16, 106
See application file for complete search history.

(56) References Cited

U.S. PATENT DOCUMENTS

| 5,774,146 A | * | 6/1998 | Mizutani ...................... 347/43 |
| 5,881,211 A | | 3/1999 | Matsumura |
| 6,014,457 A | * | 1/2000 | Kubo et al. .................. 382/167 |
| 6,181,445 B1 | * | 1/2001 | Lin et al. ..................... 358/520 |
| 6,198,552 B1 | * | 3/2001 | Nagae .......................... 358/518 |
| 6,290,318 B1 | * | 9/2001 | Yasukawa ..................... 347/16 |
| 6,608,925 B1 | * | 8/2003 | Edge et al. .................. 382/162 |
| 6,760,108 B2 | * | 7/2004 | Ohga .......................... 356/406 |

FOREIGN PATENT DOCUMENTS

| JP | 9-224158 A | 8/1997 |
| JP | 2000-253269 A | 9/2000 |

* cited by examiner

*Primary Examiner*—Aung S. Moe
*Assistant Examiner*—Peter K. Huntsinger
(74) *Attorney, Agent, or Firm*—Sughrue Mion, Pllc.

(57) ABSTRACT

The image processing method and apparatus perform data conversion so as to adapt a color image input from image input means to a predetermined output medium when the color image is to be output as a hardcopy by image output means to the predetermined output medium. The method and apparatus use data of a brightest point in the image output means for a chromatic color part of input image data while using data of a chromaticity point allowing achievement of a preferred whiteness in the image output means, for an achromatic color part of the input image data, and thereby perform the data conversion on the input image data The program executes the image processing method.

11 Claims, 3 Drawing Sheets

IMAGE PROCESSING APPARATUS, METHOD, AND PROGRAM PERFORMING CHROMATIC AND ACHROMATIC DATA CONVERSION FOR A PREFERRED WHITENESS IN AN IMAGE OUTPUT

BACKGROUND OF THE INVENTION

1. Field of the Invention

The present invention relates to an image processor, an image processing method, and a program for executing the method, and more particularly to color processing and drawing techniques in a reflective color image production method for producing a color image as a hardcopy print.

2. Description of the Related Art

Recently, a so-called color print system, which employs a printer utilizing digital exposure, that is, a digital photographic printer so that a photographic image is digitally output as a color hardcopy, has been commercially distributed and utilized. In this color print system, an image recorded on a photographic film such as a negative film or a reversal film is photoelectrically read out. The readout image is converted to a digital signal, which is then subjected to various image processing (digital signal processing) so as to obtain image data for recording. A photosensitive material is subjected to scanning exposure with recording light which is modulated in accordance with the obtained image data so as to record an image (latent image), thereby obtaining a (finished) print.

In such a system, the brightest part of image data is set so as to correspond to the minimum density of an output medium in order to widely set a reproduction range of the image Herein, the brightest part indicates a point where each of R, G and B has a value of 255 (255, 255, 255) in the case where one pixel of digital image data is represented by 8-bit data, for example. The minimum density of the output medium corresponds to a density of white in an unexposed part in the case where the output medium is a color paper, whereas it corresponds to a density of a base in its undrawn portion in the case where the output medium is an IJ (ink jet) paper.

As described above, the correspondence of the brightest part of the image data to the minimum density of the output medium is preferred in view of simplification of a printer output algorithm because such correspondence allows the individual control of three colors (R, G, B) on the one-dimensional table. In calorimetric description, the brightest point can be represented as a point where Y or L* (CIELAB) achievable on the output medium exhibits its maximum value.

However, some output mediums have a problem in that a tint is perceived in a blank part (brightest part) of the image due to correspondence of the brightest part of the image to the brightest point of the output medium as described above, resulting in insufficient final image quality.

SUMMARY OF THE INVENTION

The present invention has been made in view of the above problem, and therefore an object of the present invention is to provide an image processor capable of achieving both a high whiteness and a high color saturation so that the brightest part of an image presents preferred white while maintaining a color saturation which can be expressed with the output medium in the case where the image is to be output to such an output medium that a tint is perceived on a blank part of the image when the brightest part of the image is brought to correspondence with the brightest point of the output medium.

Another object of the present invention is to provide an image processing method used in the image processor described above.

Still another object of the present invention is to provide a program for executing the image processing method described above.

In order to attain the object described above, the first aspect of the present invention provides an image processing method for performing data conversion so as to adapt a color image input from image input means to a predetermined output medium when the color image is to be output as a hardcopy by image output means to the predetermined output medium, comprising: using data of a brightest point in the image output means for a chromatic color part of input image data while using data of a chromaticity point allowing achievement of a preferred whiteness in the image output means, for an achromatic color part of the input image data; and thereby performing the data conversion on the input image data.

Preferably, the chromaticity point allowing the achievement of the preferred whiteness is a combination (Lw*, aw*, bw*) of the highest brightness Lw* of the image output means allowing achievement of a preset ab chromaticity aw* and bw*.

Preferably, the data conversion is performed on the input image data by using the data of the brightest point in the image output means and the data of the chromaticity point allowing the achievement of the preferred whiteness.

Preferably, the use of the respective data is carried out with a combination of the respective data which are proportionally distributed according to a predetermined parameter calculated from the input image data.

In order to attain the object described above, the second aspect of the present invention provides an image processing apparatus for performing data conversion so as to adapt a color image input from image input means to a predetermined output medium when the color image is to be output as a hardcopy by image output means to the predetermined output medium, comprising: a data conversion section using data in a brightest point in the image output means for a chromatic color part of input image data while using data of a chromaticity point allowing achievement of a preferred whiteness in the image output means, for an achromatic color part of the input image data, thereby performing the data conversion on the input image data.

Preferably, the data conversion section includes; means for calculating data having the highest brightness allowing achievement of a preset whiteness in the image output means; parameter calculating means for calculating, from the input image data, a predetermined parameter indicating a shift of the input image data from an achromatic color; and data conversion means for performing data conversion with a combination of data of a chromaticity allowing the achievement of the preferred whiteness and data of the brightest point of the image output means.

In order to attain the object described above, the third aspect of the present invention provides a program for executing an image processing method for performing data conversion so as to adapt a color image input from image input means to a predetermined output medium when the color image is to be output as a hardcopy by image output means to the predetermined output medium, the image processing method comprising: using data of a brightest point in the image output means for a chromatic color part of input image data while using data of a chromaticity point allowing achievement of a preferred whiteness in the image output means, for an achromatic color part of the input image data; and thereby performing the data conversion on the input image data.

Preferably, the chromaticity point allowing the achievement of the preferred whiteness is a combination (Lw*, aw*, bw*) of the highest brightness Lw* of the image output means allowing achievement of a preset ab chromaticity aw* and bw*.

Preferably, the data conversion is performed on the input image data by using the data of the brightest point in the image output means and the data of the chromaticity point allowing the achievement of the preferred whiteness.

Preferably, the use of the respective data is carried out with a combination of the respective data which are proportionally distributed according to a predetermined parameter calculated from the input image data.

DESCRIPTION OF THE PREFERRED EMBODIMENTS

Hereinafter, an image processor, an image processing method and a program for executing the method according to the present invention will be described in detail based on a preferred embodiment illustrated in the accompanying drawings.

Figure 1:
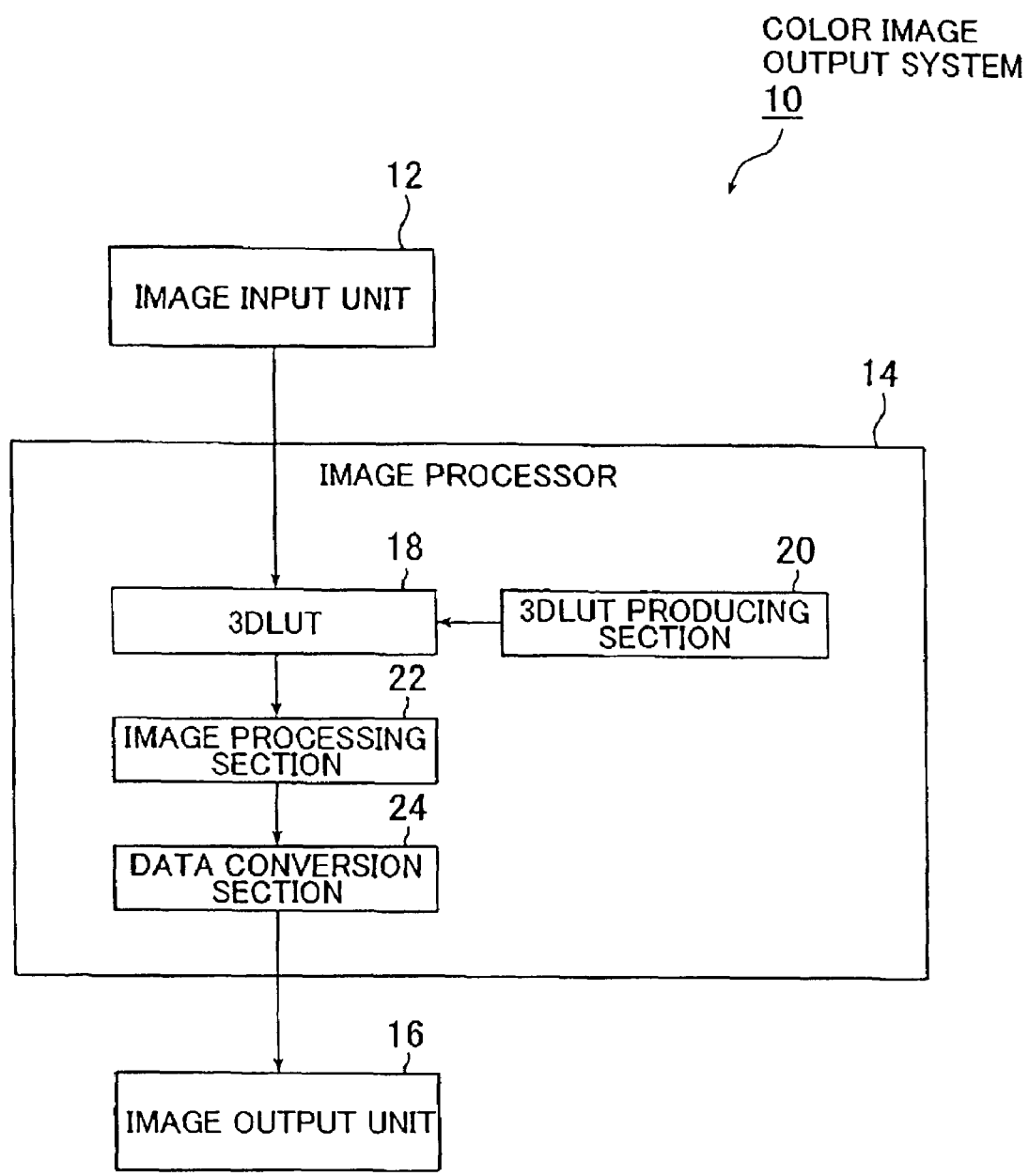
FIG. 1 is a block diagram schematically showing an embodiment of a color image output system including an image processor according to the present invention.

FIG. 1 is a block diagram schematically showing an embodiment of a color image output system including an image processor of the present invention. As shown in FIG. 1, a color image output system 10 of this embodiment includes: an image input unit 12; an image processor 14; and an image output unit 16. The image processor 14 includes: a 3DLUT producing section 20 for producing a 3DLUT 18 indicating the correspondence between density data and light amount data for conversion of an input image signal; an image processing section 22 for performing various normal image processing; and a data conversion section 24 for performing data conversion so that the image data is adapted to an output medium for outputting an image through the image output unit 16.

The image input unit 12 is not particularly limited A scanner for reading out an original image to be input, or an input unit for photographing a subject with a digital camera for input may be used. The input color image data (input image signal) is input to the image processor 14 as digital image data.

The image processor 14 performs predetermined image processing on the input image signal for data conversion adapted to the output medium so as to output the converted image signal to the image output unit 16. As an suitable example of the image output unit 16, for example, there can be given a laser printer for performing image exposure on a special-purpose or specific image recording medium (output medium) such as a photosensitive material, a photosensitive object or the like based on processed and converted image data output from the image processor 14 and then performing the developing processing on an exposed recording material so as to output the image data as a visible reproduced image.

As described above, the image processor 14 includes the 3DLUT producing section 20 for producing the 3DLUT 18, the image processing section 22 and the data conversion section 24. The 3DLUT producing section 20 produces the 3DLUT 18 indicating the relationship between the density and the light amount of input image data. In order to produce the 3DLUT 18, a chart for 3DLUT production is output from the image output unit 16. The chart for 3DLUT production is read with the image input unit 12 so as to be input to the image processor 14. The input chart for 3DLUT production is sent to the 3DLUT producing section 20. In the 3DLUT producing section 20, the 3DLUT 18 indicating the relationship between density data and light amount data is produced from the amount of exposure upon exposure of the chart for 3DLUT production with the image output unit 16 and a density output value upon recording the chart for 3DLUT production with the image input unit 12.

In addition to color balance adjustment, contrast correction, brightness correction, and further normal image processing such as sharpness processing and dodging processing, processing for correcting aberration such as distortion aberration, magnification color aberration, deterioration of marginal luminosity and image blurring based on aberration characteristics of a photo-taking lens are performed in the image processing section 22 as the need arises. The processed image data, which undergoes the image processing in the image processing section 22, is sent to the data conversion section 24. In the data conversion section 24, the data conversion is performed so that a color image is adapted to the output medium for digitally outputting the color image as a color hardcopy.

Figure 2:
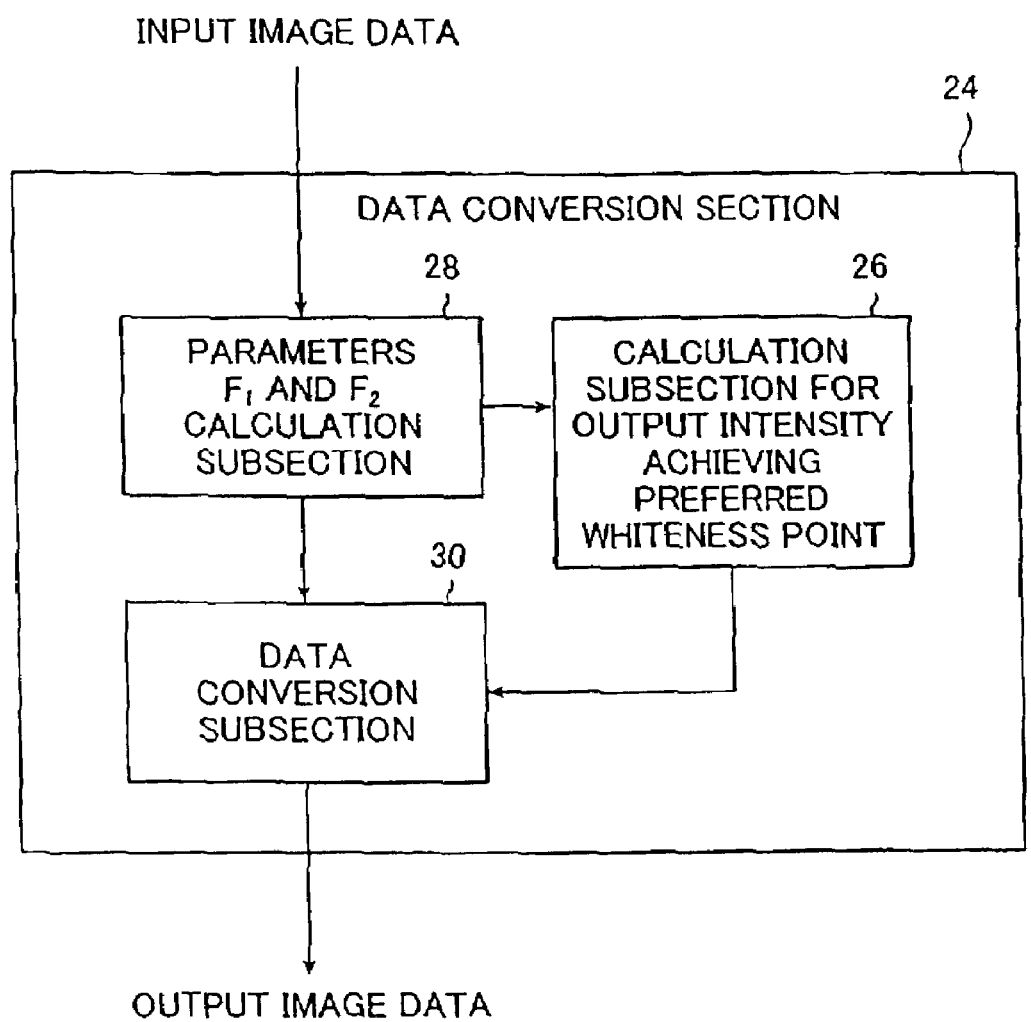
FIG. 2 is a block diagram schematically showing a data conversion section in FIG. 1.

FIG. 2 is a block diagram schematically showing the data conversion section 24. As shown in FIG. 2, the data conversion section 24 includes: a subsection 26 for calculating output intensity for achieving a preferred whiteness point; a parameter calculation subsection 28 for calculating predetermined parameters F1 and F2 for use in data conversion; and a data conversion subsection 30 for actually performing the data conversion.

The subsection 26 for calculating an output intensity for achieving a preferred whiteness point obtains the highest brightness Lw* which allows the achievement of an ab chromaticity (aw*, bw*) for providing a preset preferred whiteness in the image output unit 16 of the system of the present invention so as to calculate the corresponding output intensity (Orw, Ogw, Obw) of the image output unit 16 in reference to the 3DLUT 18. The parameter calculating subsection 28 for calculating the predetermined parameters F1 and F2 calculates the predetermined parameters F1 and F2 indicating a shift of the input image data from an achromatic color.

The data conversion subsection 30 uses the predetermined parameters F1 and F2 so as to perform the data conversion on the image-processed input image data with the combination of the output intensity (Orw, Ogw, Obw) corresponding to the chromaticity (Lw*, aw*, bw*) for achieving the preferred whiteness, with the output intensity (Oro, Ogo, Obo) of the image output unit 16 corresponding to the highest brightness (Lo*, ao*, bo*) that is achieved in the image output unit 16 of the system of the present invention.

Figure 3:
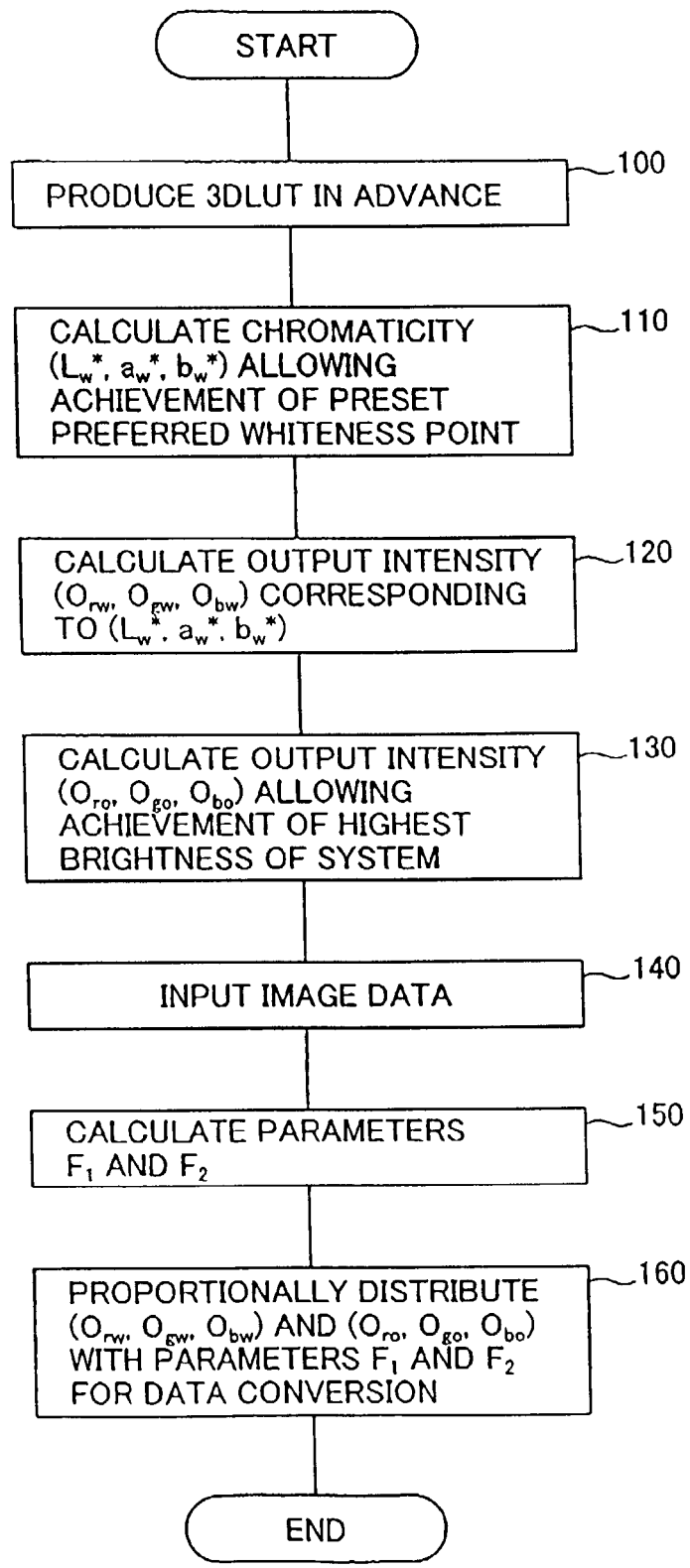
FIG. 3 is a flow chart showing the effects of the embodiment.

Hereinafter, the actions of this embodiment will be described in detail, particularly for data conversion, in accordance with a flow chart of FIG. 3. First, at a step 100 in FIG. 3, the 3DLUT 18 indicating the relationship between the density data and the light amount data is produced in advance in the 3DLUT producing section 20 by the method as described above. Next, at a step 110, the highest brightness Lw* which allows the achievement of the preset preferred whiteness point (aw*, bw*) in the image output unit 16 of the system of the present invention is calculated.

Generally, the Japanese tend to prefer slightly bluish white as a white color. Therefore, in this embodiment, for example, aw*=0 and bw*=−5 are set as the ab chromaticity for providing the preferred whiteness. Then, in the image output unit 16 of the system of the present invention, the highest brightness Lw* for achieving (aw*, bw*)=(0, −5) is to be obtained. The combination of these values (Lw*, aw*, bw*) is defined as a chromaticity point for achieving the preferred whiteness.

Next, at a step 120, the output intensity (Orw, Ogw, Obw) of the image output unit 16 corresponding to the chromaticity point (Lw*, aw*, bw*) for achieving the preferred whiteness is calculated with reference to the 3DLUT 18. Then, at a step 130, after obtaining the highest brightness point (Lo*, ao*, bo*) (i.e., a high reflectance of the output medium) that is achievable by the image output unit 16 of the system of the present invention, an output intensity (Oro, Ogo, Obo) corresponding to the obtained highest brightness point is obtained. Next, at a step 140, color image data is input from the image input unit 12 so as to perform normal image processing in the image processing section 22.

Next, at a step 150, the predetermined parameters F1 and F2, which are used for data conversion, are calculated from the input image data. These parameters are calculated as follows from the (image) output intensity (Or, Og, Ob) of the image-processed input image data upon its output from the image output unit 16. Specifically, a difference D1 between the maximum value and the minimum value is calculated according to the following Expression (1).

$$D1 = \text{Max}\{Or, Og, Ob\} - \text{Min}\{Or, Og, Ob\} \quad (1)$$

With this value, the parameter F1 is calculated according to the following Expression (2).

$$F1 = D1/\text{Max}\{Or, Og, Ob\} \quad (2)$$

In a similar manner, a difference D2 between the intermediate value and the minimum value is obtained from the output intensity (Or, Og, Ob) of the input image data according to the following Expression (3).

$$D2 = \text{Med}\{Or, Og, Ob\} - \text{Min}(Or, Og, Ob) \quad (3)$$

where the Med (Or, Og, Ob) represents the intermediate value among Or, Og and Ob. From the obtained value, the parameter. F2 is calculated according to the following Expression (4).

$$F2 = D2/\text{Max}\{Or, Og, Ob\} \quad (4)$$

In the case where the input image data represents an achromatic color, Or=Og=Ob is established. Therefore, D1=D2=0 is obtained from the above Expressions (1) and (3). Thus, according to the Expressions (2) and (4), both the parameters F1 and F2 are 0. Specifically, it can be said that these parameters represent a shift from the achromatic color.

Next, at a step 160, the data conversion is performed. More specifically, interior division conversion is performed, by using the obtained parameters F1 and F2, on the output intensity (Orw, Ogw, Obw) corresponding to the highest brightness point allowing the achievement of the obtained preferred whiteness and the output intensity (Oro, Ogo, Obo) corresponding to the highest brightness point of the system obtained at the step 130. The case of: Or=Max (Or, Og, Ob) and Og=Med (Or, Og, Ob) among values of (Or, Og, Ob) is illustrated as an example. The interior division conversion can be performed according to the following Expressions (5) to (7).

$$Or' = (1-F1) \cdot Orw + F1 \cdot Oro \quad (5)$$

$$Og' = (1-F2) \cdot Ogw + F2 \cdot Ogo \quad (6)$$

$$Ob' = Ob \quad (7)$$

In the case where the input image data (Or, Og, Ob) represents an achromatic color, F1=F2=0 is obtained as described above. Therefore, Or'=Orw and Og'=Ogw are obtained according to the Expressions (5) and (6). Thus, on the achromatic color part, the data conversion is performed by using data of the brightness point allowing the achievement of the preferred whiteness. In the case of a chromatic color, values of the parameters F1 and F2 are increased Therefore, as can be understood from the Expressions (5) and (6), the conversion is performed with such a combination that a ratio of the data Oro or Ogo of the highest brightness achievable by the system is increased. On the contrary, in the case of an achromatic color, values of the parameters F1 and F2 are decreased. Therefore, as can be understood from the Expressions (5) and (6), a ratio of the data of Orw or ogw is increased on data conversion.

More specifically, the data conversion (color conversion) is performed so that the brightest data (for example, in the case where the digital image data is represented as 8-bit data, data in the vicinity of (255, 255, 255) (white)) is mapped in the vicinity of the ab chromaticity providing the preset preferred whiteness (aw*=0, bw*=−5) with the increase in density as low as possible, whereas other colors (high saturation colors) are mapped without such a limitation.

In this manner, the image data, which undergoes the data conversion so as to be adapted to the output medium, is output from the image output unit 16 as a hardcopy. As described above, in this embodiment, the data conversion is performed so that the data having such a chromaticity that allows the achievement of a preferred whiteness is used for the achromatic part. For the chromatic part, the data of the respective highest brightnesses are combined so that a ratio of the data of the highest brightness achievable by the system is increased. As a result, a preferred white color that does not allow the perception of any tint is reproduced in a highlight area while an excellent image is reproduced without inducing any reduction in color saturation in a high color saturation area.

The image processor, the image processing method, and the program for executing the method according to the present invention has been described above in detail. However, the present invention is not limited to the above embodiment. It is apparent that various modifications or changes may be possible as long as they do not depart from the summary of the present invention.

As described above, according to the present invention, in the case where an image is to be output to an output medium on which a tint is perceived in a blank area of the image when the brightest part of the image is brought to correspondence with the brightest point of the output medium, the image reproduction can be realized so that the brightest part of the image presents a preferred white color without lowering a color saturation which can be expressed with the output medium.

EXAMPLES

Hereinafter, more specific examples will be described. In these examples, a laser printer PHISUL 2 produced by Fuji Photo Film Co., Ltd. is used as the image output unit 16, and a color paper digital 3 produced by Eastman Kodak (EK) Company is used as an image output medium (media).

First, a chart for 3DLUT production is exposed onto the digital 3 in the PHISUL 2, which is in turn recorded with a scanner SG1000 produced by Dainippon Screen MGF Co., Ltd. to produce a 3DLUT representing the relationship between an image output signal of the PHISUL 2 and a density of the scanner. Alternatively, the 3DLUT may be produced as a 3DLUT representing the relationship between the image output signal of the PHISUL 2 and a calorimetric value obtained with a colorimeter TC1800 produced by Tokyo Denshoku Co., Ltd. in addition to the above relationship.

As samples of input image data, data of types 1 to 4 having set values of Lab as shown in the following Table 1 in the highest density part are prepared.

TABLE 1

|  | L | a | b |
|---|---|---|---|
| Type 1 | 2.002 | −0.548 | −1.579 |
| Type 2 | 2.457 | −0.372 | −1.530 |
| Type 3 | 5.830 | 0.199 | −2.542 |
| Type 4 | 10.108 | 0.953 | −2.185 |

With respect to these input image data, a blank (the brightest point) having Lab values as shown in the following Table 2 are set as a target preferred whiteness. In this case, the whiteness W is calculated according to the following Equation (8).

$$W = \{98.03 - [17 \cdot (98.03 - L^*)^2 + 2090 \cdot (-0.18 - a^*)^2 + 290 \cdot (-5.48 - b^*)^2 + 705 \cdot (-0.18 - a^*)(-5.48 - b^*)]^{1/2}\} \cdot 100/98.03 \quad (8)$$

TABLE 2

|  | L | a | b | Whiteness |
|---|---|---|---|---|
| a (Example) | 88.000 | 0.570 | −5.230 | 42 |
| b (Example) | 90.790 | 0.440 | −5.200 | 56 |
| c (test) | 91.470 | 0.170 | −0.970 | 9 |
| d (D3, Original) | 92.030 | 0.240 | −2.440 | 31 |

In this manner, the predetermined parameters F1 and F2 are calculated in the manner as described above by using the brightest point data allowing the achievement of the preset preferred whiteness. Then, the data conversion is performed according to the above Expressions (5) to (7), so that a color image is output through the printer (PHISUL 2). The result of a sensory psychological evaluation on the output images is shown in the following Table (3).

TABLE 3

| Sample | | Psychological evaluation results |
|---|---|---|
| Type 1 | a (Example) | 9.3 |
| Type 1 | b (Example) | 9.7 |
| Type 1 | c (test) | 6.0 |

TABLE 3-continued

| Sample | | Psychological evaluation results |
|---|---|---|
| Type 1 | d (D3, Original) | 7.5 |
| Type 2 | a (Example) | 8.8 |
| Type 2 | b (Example) | 9.0 |
| Type 2 | c (test) | 5.8 |
| Type 2 | d (D3, Original) | 7.0 |
| Type 3 | a (Example) | 7.6 |
| Type 3 | b (Example) | 8.0 |
| Type 3 | c (test) | 4.9 |
| Type 3 | d (D3, Original) | 5.6 |
| Type 4 | a (Example) | 6.0 |
| Type 4 | b (Example) | 6.2 |
| Type 4 | c (test) | 3.9 |
| Type 4 | d (D3, Original) | 4.8 |

The sensory psychological evaluation allows the evaluation of good reproduction of the image (contrast of color and brightness and a reproduced area). The lowest level sample: 0 point and the highest level sample: 10 points are separately and additionally produced. The evaluators are asked to judge the level of the samples to accomplish the evaluation. The above Table 3 shows the average levels judged by ten evaluators.

As shown in Table 3, it is understood that the results of Examples a and b are excellent in any of the types 1 to 4. According to these Examples, the image which is subjected to the data conversion of the present invention presents a preferred white color without giving any tint in a highlight area as compared with an unprocessed image while maintaining the same color saturation as that of the unprocessed image in a high color saturation area without inducing any decrease in color saturation.

If the white color is obtained simply through one-dimensional conversion, a drop in color saturation is induced. The data conversion processing according to the present invention may be partially performed on a white area or may be performed focusing on an achromatic color having an intermediate or high density. Also in this area, (aw*=0, bw*=−5) are preferred as an ab chromaticity providing a preset preferred whiteness.

Moreover, in the present invention, the image processing may also be performed as follows. A software for performing the image processing such as sharpness conversion described above may be integrated into a program to be recorded on a recording medium. The program recorded on the recording medium is read out from the recording medium prior to the image processing so as to be downloaded on a CPU of the image processor 14. As a recording medium for recording such a program, any recording medium can be used as long as it is capable of recording a program for performing the image processing such as the above-described sharpness conversion. For example, a magnetic tape, a flexible disk (FD), a hard disk (HD), magnetic recording mediums such as ZIP, MD, JAZ and a PC card, magneto-optical recording mediums such as MO and PD, optical recording mediums such as CD and the like are given as examples thereof.

What is claimed is:

1. An image processing method for performing data conversion so as to adapt a color image input from image input means to a predetermined output medium when the color image is to be output as a hardcopy by image output means to the predetermined output medium, comprising:

obtaining data of a brightest point in the image output means and data of a chromaticity point allowing achievement of a preferred whiteness in the image output means; and performing the data conversion on the input image data by using the data of the brightest point for a chromatic color part of the input image data and the data of the chromaticity point for an achromatic color part of the input image data, wherein the data conversion is performed on the input image data by using the data of the brightest point in the image output means and the data of the chromaticity point allowing the achievement of the preferred whiteness, wherein the performing the data conversion is carried out by proportionally distributing a combination of the data of the brightest point and the data of the chromaticity point according to a parameter calculated from the input image data, wherein the parameter is calculated based on a difference between a maximum value and a minimum value of an image output intensity (Or, Og, Ob) of the image-processed input image data upon its output from the image output means and a difference between an intermediate value and the minimum value of the image output intensity.

2. The image processing method according to claim 1, wherein the chromaticity point allowing the achievement of the preferred whiteness is a combination (Lw*, aw*, bw*) of the highest brightness Lw* of the image output means allowing achievement of a preset ab chromaticity aw* and bw*.

3. The image processing method according to claim 2, wherein the highest brightness Lw* of the image output means is calculated to allow the achievement of a preset preferred whiteness point (aw*, bw*) in the image output means.

4. The image processing method according to claim 1, wherein the data conversion for a chromatic color part of the input image data is performed with such a combination that a ratio of the data of the brightest point to the data of the chromaticity point is increased; and wherein the data conversion for an achromatic color part of the input image is performed with such a combination that a ratio of the data of the chromaticity point to the data of the brightest point is increased.

5. The image processing method according to claim 1, wherein the data conversion is performed using the parameter on:

an output intensity (Orw, Ogw, Obw) corresponding to the chromaticity point (Lw*, aw*, bw*) allowing achievement of the preferred whiteness; and an output intensity (Oro, Ogo, Obo) corresponding to the highest brightness point of the image output means.

6. The image processing method according to claim 1, wherein the parameter is two dimensional (F1, F2);

where F1 is calculated as a ratio of the difference between the maximum value and the minimum value of the image output intensity (Or, Og, Ob) of the image processed input image data upon its output from the image output means to the maximum value of the image output intensity (Or, Og, Ob); and F2 is calculated as a ratio of the difference between the intermediate value and the minimum value of the image output intensity (Or, Og, Ob) to the maximum value of the image output intensity (Or, Og, Ob).

7. The image processing method according to claim 6, wherein the data conversion is performed using the parameter on:

an output intensity (Orw, Ogw, Obw) corresponding to the chromaticity point (Lw*, aw*, bw*) allowing achievement of the preferred whiteness; and an output intensity (Oro, Ogo, Obo) corresponding to the highest brightness point of the image output means.

8. The image processing method according to claim 7, wherein the case where Or is equal to the maximum value of the image output intensity (Or, Og, Ob) and Og is equal to the intermediate value of the image output intensity (Or, Og, Ob), the data conversion can be performed according to the following expressions:

$$Or' = (1-F1) \cdot Orw + F1 \cdot Oro$$

$$Og' = (1-F2) \cdot Ogw + F2 \cdot Ogo$$

$$Ob' = Ob.$$

9. The image processing method according to claim 6, wherein when the input image data represents an achromatic color, Or=Og=Ob is established.

10. A computer readable storage medium storing a computer program for executing an image processing method for performing data conversion so as to adapt a color image input from image input means to a predetermined output medium when the color image is to be output as a hardcopy by image output means to the predetermined output medium, the image processing method comprising:

obtaining data of a brightest point in the image output means and data of a chromaticity point allowing achievement of a preferred whiteness in the image output means; and performing the data conversion on the input image data by using the data of the brightest point for a chromatic color part of the input image data and the data of the chromaticity point for an achromatic color part of the input image data, wherein the data conversion is performed on the input image data by using the data of the brightest point in the image output means and the data of the chromaticity point allowing the achievement of the preferred whiteness, wherein the performing the data conversion is carried out by proportionally distributing a combination of the data of the brightest point and the data of the chromaticity point according to a parameter calculated from the input image data, wherein the parameter is calculated based on a difference between a maximum value and a minimum value of an image output intensity (Or, Og, Ob) of the image-processed input image data upon its output from the image output means and a difference between an intermediate value and the minimum value of the image output intensity.

11. The computer readable storage medium according to claim 10, wherein the chromaticity point allowing the achievement of the preferred whiteness is a combination (Lw*, aw*, bw*) of the highest brightness Lw* of the image output means allowing achievement of a preset ab chromaticity aw* and bw*.

* * * * *